United States Patent [19]

Chiavatti

[11] Patent Number: 5,115,851
[45] Date of Patent: May 26, 1992

[54] TIRE TRACTION DEVICE

[76] Inventor: Claudio Chiavatti, 232 Dowdy Dr., Paulsboro, N.J. 08066

[21] Appl. No.: 659,725

[22] Filed: Feb. 22, 1991

[51] Int. Cl.⁵ .................................. B60C 27/20
[52] U.S. Cl. .................................. 152/225 R
[58] Field of Search ............... 152/223, 225 R, 225 C, 152/226, 227, 228, 232

[56] References Cited

U.S. PATENT DOCUMENTS

| | | | |
|---|---|---|---|
| 760,731 | 5/1904 | Cleeland | 152/228 |
| 1,254,089 | 1/1918 | Thomas | 152/228 |
| 1,831,542 | 11/1931 | Overtoom | 152/225 C |
| 2,464,564 | 3/1949 | Dunner et al. | 152/225 C |
| 2,501,973 | 3/1950 | Seymour | 152/228 |
| 2,530,108 | 11/1950 | Whichard, Sr. et al. | 152/228 |
| 2,646,834 | 7/1953 | Rusch | 152/225 C |
| 2,649,885 | 8/1953 | Brown | 152/225 C |
| 2,652,092 | 9/1953 | Lantz | 152/225 C |
| 2,664,934 | 1/1954 | Safran | 152/225 C |
| 2,976,903 | 3/1961 | Verdesca | 152/225 C |
| 3,157,217 | 11/1964 | Ledbetter | 152/225 C |
| 3,245,451 | 4/1966 | Gellman | 152/225 C |
| 3,861,437 | 1/1975 | Belknap | 152/225 C |

Primary Examiner—Michael W. Ball
Attorney, Agent, or Firm—Connolly & Hutz

[57] ABSTRACT

A tire traction device includes a plate which extends across the tread of a tire. The ends of the plate are provided with fasteners for securing the plate on the tire so that the sharp edges of the plate provide traction to enable a vehicle to move away from a slippery surface, such as an ice coated street.

9 Claims, 1 Drawing Sheet

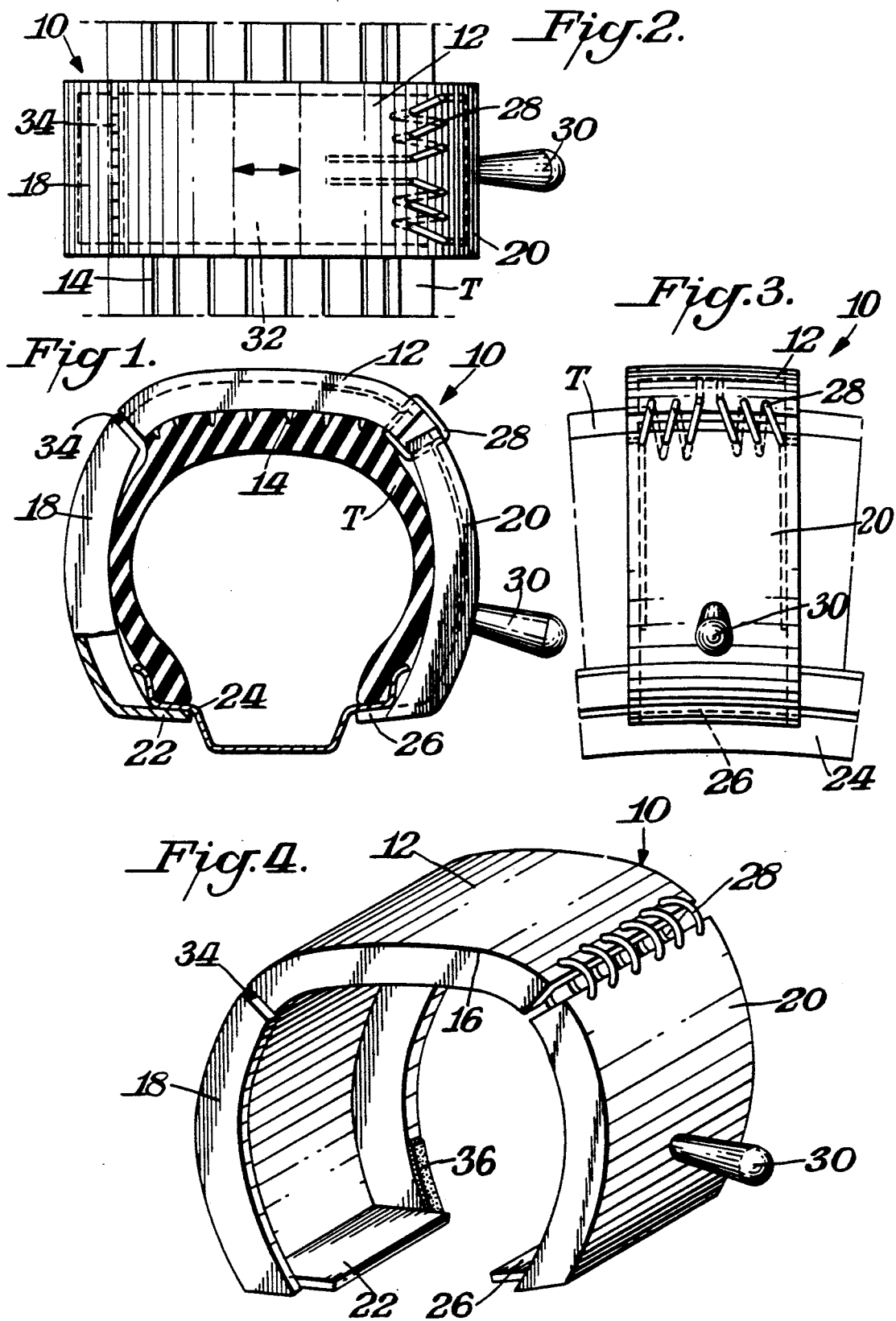

TIRE TRACTION DEVICE

BACKGROUND OF INVENTION

The present invention is directed to a device for applying traction to vehicle tires. Such a device has a particular use when a vehicle is on, for example, an ice covered or a snow packed street and is unable to get sufficient traction to move away from the slippery area onto a less slippery surface, such as a plowed portion of the street. Presently, various devices and techniques are used to assist a driver in moving his vehicle from an icy spot where there is insufficient traction from the tire tread itself which would cause the tire to simply spin and not move the vehicle either forward or backward. One technique is to permanently incorporate different devices on the tires. Such devices, for example, may be chains or studs. Various localities, however, prohibit the use of tires having chains and studs because of the damage these devices cause to the street or highway. Other techniques are more of a makeshift variety including attempting to wedge some type of object between the tire and the slippery surface. These techniques not only have varying degrees of success, but also have the inherent danger that the spinning tire may cause the object to be dislodged in the manner of a missile which could cause injury or damage.

It would be desirable if a device could be provided which could function to provide sufficient traction to enable a driver to move a vehicle off the slippery surface and then be able to remove the device so that the vehicle could then operate in a normal manner.

SUMMARY OF INVENTION

An object of this invention is to provide a tire traction device capable of overcoming the above problems and fulfilling the above needs.

A further object of this invention is to provide such a device which may be quickly and conveniently mounted on a tire in a detachable manner so that once the vehicle is moved from the slippery surface the device may be readily detached to permit the vehicle to operate in a normal fashion.

In accordance with this invention, the tire traction device is in the form of a flat band or plate having a sharp edge for digging into the slippery surface. The band would be detachably mounted across the tire tread by fasteners at each end of the band which are secured to the tire rim. In a preferred practice of the invention at least one of the fasteners includes a clip resiliently mounted to a closed position with a lever arm for manipulating the clip to its open position. The fasteners may be lined with cushioning material to prevent scratching or damage to the tire rim. If desired, the band may include some means to permit its length to be increased for accommodating a range of different size tires.

BRIEF DESCRIPTION OF THE DRAWINGS

FIG. 1 is a front elevational view, partly in section, of a tire traction device mounted on a tire in accordance with this invention;

FIG. 2 is a top plan view of the device shown in FIG. 1;

FIG. 3 is a side elevational view of the device shown in FIGS. 1-2; and

FIG. 4 is a perspective view of the device shown in FIGS. 1-3.

DETAILED DESCRIPTION

In the drawings, tire traction device 10 is in the form of a generally flat band or plate 12 which would be mounted across the tread 14 of a tire T. Band 12 may take any suitable form. The significant features of band 12, however, are that it is of sufficient rigidity for its intended purpose and that it includes sharp edges 16 at its outer surface for digging into a slippery surface, such as an icy or snow packed street or highway. Band 12 may be made of any suitable thickness and in the preferred practice of the invention is ¾ inches thick and three inches wide. The length of band 12 would depend upon the width of the tire on which it is mounted.

Band 12 is secured across the tread 14 of a tire T in any suitable manner provided that the mounting is detachable so that the band may be quickly and easily attached to the tire T and then removed from the tire after the vehicle has been moved from the slippery area. The drawings illustrate a preferred practice of this invention wherein a pair of fasteners 18,20 is mounted to each end of band 12. Fastener 18 is, for example, a curved clip which terminates in an in-turned or hook end 22 for fitting against the rim 24 of the tire. Fastener 20 is similarly a clip having a hook end 26 which fits against the opposite portion of rim 24. The fasteners may be stamped from metal.

In the preferred embodiment, fastener 18 is immovably fixed to band 12 as by welding. Alternatively fastener 18 and band 12 may be pivotally connected by hinge 34. Fastener 20, however, must be movably mounted. As shown, fastener 20 is connected to band 12 by a torsion coil spring 28 which urges fastener 20 to its closed position. FIGS. 2-3 illustrate two springs.

The ends of spring 28 react against band 12 and fastener 20 to provide a strong resilient force that urges fastener 20 toward fastener 18.

When it is intended to mount device 10 on a tire a lever or handle 30 secured in any suitable manner to fastener 20 is manipulated, such as by an outward pull to overcome the force of spring 28 and move fastener 20 away from fastener 18 so that fastener 20 is thereby in its open position. While in the open position, fastener 18 can be hooked around the side of the tire with band 12 spanning the tire tread. Fastener 20 would then be moved to its closed position, either under the influence of spring 28 or by an inward pushing of handle or lever 30. In this operation handle 30 acts as a lever to help pull fastener 20 downwardly a sufficient degree for hook 26 to engage rim 24. Any suitable connection may be used in conjunction with spring 28, such as a temporary locking device to hold fastener 20 in its opened position. The locking device would then be inactivated when it is time to mount device 10 on the tire. Handle 30 may be detachably mounted to fastener 20 by, for example, a threaded connection so that handle could be detached to form a more compact unit during storage.

The invention may be practiced by forming sets of devices 10 so that each device is customized to a particular tire size. Alternatively, the invention may be practiced by providing some form of length adjustment to band 12 to permit the same device to be used on a variety of sizes of tires. For example, FIG. 2 shows, in phantom, a resilient transition section 32 located in the central portion of band 12. Section 32 may be made of any suitable resilient material, such as rubber, which would permit band 12 to be stretched and thereby increase its length to accommodate wider tires. Other forms of length adjustment could be used such as by forming band 12 as a set of telescopically arranged plates. The particular manner of length adjustment is not critical as long as the resultant band includes at least one sharp shoulder capable of digging into the slippery surface.

Although the preferred practice of the invention, which is illustrated herein, shows a specific form of fastening means, the invention may be practiced with other fasteners, such as buckles, or screws which provide the necessary adjustability to provide a sufficiently open area to permit the device 10 to be slid onto the tire and then the fastener would be manipulated to lock the device in place. Another variation of the invention, would be to form fastener 18 similar to fastener 20 so that fastener 18, likewise is resiliently connected to band 12. Fastener 18 could have its own handle or lever or could be interconnected to fastener 20 so that the same lever 30 jointly operates to simultaneously open and close both fasteners.

Device 10 may be made of any suitable materials. In the preferred practice of the invention, device 10 is made of a metal for long life and sufficient rigidity with enough resiliency to conform to the curvature of tread 14. Device 10 could be made of plastic or hard rubber which could include suitable reinforcement strips. Another feature of the invention, would be to include a cushioning liner 36 on the inner surface of device 10 and particularly on the inner surface of the fasteners so as to avoid scratching or damage to the tire particularly when device 10 is made of metal.

In practice one or two devices 10 would be provided for each vehicle. When a vehicle is, for example, parked on an icy surface and the driver is unable to move the vehicle to the portion of the street which is cleared of the ice or snow, device 10 is mounted on one or two of the tires which would ordinarily simply spin because of lack of traction if the driver tried to drive the vehicle from the icy surface. The mounting could be quickly and conveniently accomplished through the use of the fasteners whereupon the band 12 would span across the tread 14 of tire T. When the driver then attempts to move the vehicle, the rotating tire would cause sharp edge 16 to dig into the slippery surface creating sufficient traction to permit the driver to move the vehicle away from the slippery surface a sufficient distance so that the vehicle would be in an area wherein the tire tread itself would have the necessary traction. Device 10 would then be removed from tire T and the vehicle could resume normal driving operations.

What is claimed is:

1. A tire traction device comprising a band in the form of a rigid plate having an outer surface and depending side walls for spanning across the tread of a tire, said band having a sharp edge at a junction of said outer surface and said side walls for digging into a slippery surface upon rotation of the tire, a first fastener secured to one end of said band for mounting to a portion of the tire remote from the tread, said first fastener terminating at its end remote from said band in an inwardly directed hook for fitting against a tire rim, a second fastener secured to an end of said band remote from said first fastener, said second fastener terminating at its end remote from said band in an inwardly directed hook for fitting against a portion of a tire rim remote from the tread, said second fastener being pivotally connected to said band by torsion coil spring, said torsion coil spring comprising the sole connection of said second fastener to said band, said spring means further comprising resilient means for urging said hooks toward each other to lock said band against the tire tread, and a handle on one of said fasteners for selectively moving its said hook out of engagement with the tire to detach said device from the tire.

2. The device of claim 1 wherein said handle is secured to said second fastener.

3. The device of claim 2 wherein said band is extendable in length to fit different size tires.

4. The device of claim 3 wherein each of said fasteners has an inner lining made of cushioning material.

5. The device of claim 3 wherein said band includes a resilient transition section whereby said band is extendable.

6. The device of claim 1 wherein said band is extendable in length to fit different size tires.

7. The device of claim 6 wherein said band includes a resilient transition section whereby said band is extendable.

8. The device of claim 1 wherein said first fastener is hinged to said band.

9. The device of claim 1 wherein said spring means comprises two torsion coil springs.

* * * * *